D. A. WOODWARD.
Heliostat.

No. 31,639.

Patented March 5, 1861.

Witnesses
J. T. Taylor
J. H. Hood

Inventor
David A. Woodward
by his Attorney
W. Morris Smith

UNITED STATES PATENT OFFICE.

DAVID A. WOODWARD, OF BALTIMORE, MARYLAND.

MODE OF OPERATING REFLECTORS OF SOLAR CAMERAS.

Specification of Letters Patent No. 31,639, dated March 5, 1861.

*To all whom it may concern:*

Be it known that I, DAVID A. WOODWARD, of Baltimore, in the State of Maryland, have invented certain new and useful Improvements in the Manner of Operating Reflectors of Solar Cameras; and I do hereby declare that the following is a full, clear, and exact description thereof, reference being had to the accompanying drawing through letters of reference marked thereon, in which—

Figure 1:
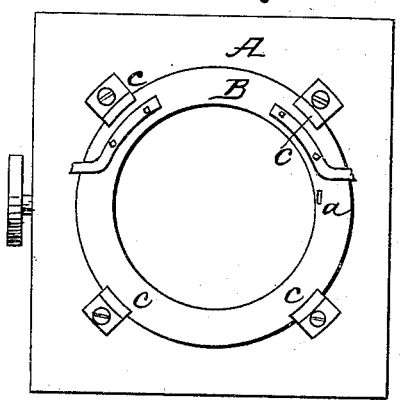
Figure 2:
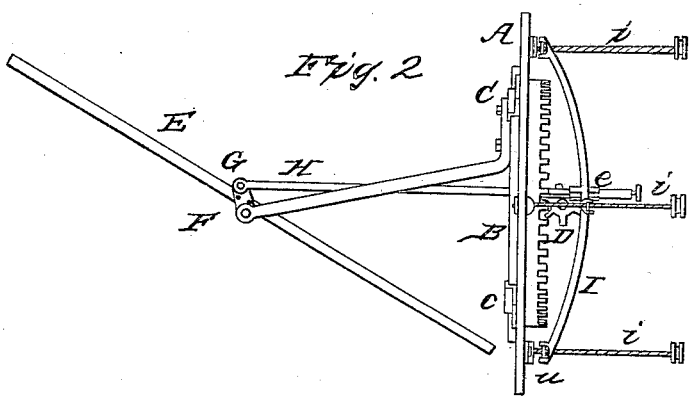
Figure 3:
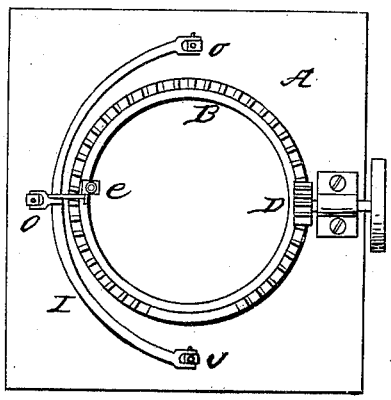
Figure 4:
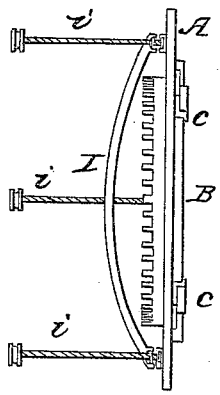

Figure 1 represents the rear, or mirror side, of the plate to be attached to the back of the camera, or to the window shutter. Fig. 2 is a side elevation, as seen from the east at noon. Fig. 3 is an interior, or face view, and Fig. 4 a reverse side elevation, without the mirror and its supports.

The nature of my invention consists first, in combining with the pivotal axis of the mirror a short lever and connecting rod, so that its angle of inclination may be varied with great accuracy, and comparatively without force or friction; secondly, in combining with the revolving collar to which the mirror is attached, an adjustable rail, to be spanned by a traverser on the rod, connected with the lever on the side of the mirror, by means of which the necessary varying inclination of the mirror, in its revolution, may be regulated throughout the day, at any season of the year, and when once set the variation from day to day is easily adjusted.

By this improvement, the mirror may be made to follow the course of the sun with more certainty and with less trouble to the operator, than by any of the means usually employed; and by attaching an ordinary clock train, it may be made self operating.

To enable others to make and use my invention I will describe its construction and operation.

(A) is a plate to be attached to the rear of the camera, or to the closed shutter of a window, and has a round hole cut in the center, in which is fitted a flanged collar (B), which is held in its place and supported concentric therewith by cleats (C), which for large instruments are fitted with rollers for the flange to rest upon, in order to reduce the friction in its revolution; the inner edge of this collar is toothed and forms a face-gear wheel, and is rotated by a pinion (D) gearing into it; or it may be toothed as a spur wheel, and rotated by a screw on its periphery, as deemed most expedient.

To the back of the flanged collar (B) are attached two brackets, about half the length of the mirror (E) having an eye in the extremity of each, to receive the pivots (F) on which the mirror vibrates. I arrange these pivots slightly below, or at the back of the mirror, and so near the center that it is nearly, but not quite, balanced, and on one side of the mirror is an arm (G) extending upward from the pivot about an inch and a half, more or less, to which is attached a rod (H) which passes horizontally through a small aperture (*a*) in the flange (B) inside the geer teeth on its face; the inner end of this rod is fitted with an adjustable traverser (*e*) which consists of two prongs (with rollers if necessary) to span and traverse the curved rail (I) as the collar is rotated. This curved rail extends from the bottom of the circle, around one side to the top, nearly parallel with the periphery of the collar, and is supported on three screw pillars (*i*) one at each end, and one in the center; the middle one is connected with the plate (A) so as to rotate and maintain its position at right angles to the plate, and passes through a swinging nut (*o*) in a swivel arm on said rail, of such length as to allow the traverser to pass; the upper and lower ones are fitted with cup and ball joints to the plate, and pass through swinging nuts at the ends of the rail, so that their inclination may conform to the different positions of the rail; and one of them is provided with a thumb screw (*u*) to clamp the ball in the cup on the plate when properly set, and thus prevent it drooping.

The diurnal motion is given to the mirror by rotating the pinion (D) which may, if deemed desirable, be done by connecting it with a clock train.

In operating, with this apparatus, rotate the mirror until it receives the reflection of the sun at right angles, transversely, then adjust the traverser to vary the inclination of the mirror lengthwise, until the sun's disk is focused on the center of the illuminating lens, which fills the opening in center of the flanged collar (B), when, (if the rail has been properly adjusted,) by rotating the collar (B) so as to keep the mirror square to the sun transversely, its longitudinal inclination will be regulated by the rail and traverser; which, if incorrect may be readily adjusted to raise or lower the mirror by turning the middle or upper screw pillars (*i*), as necessary, at intervals during the day.

Having thus described my invention, what I claim as new and desire to secure by Letters Patent, is—

1. The arrangement and combination of the pivotal axes of the mirror with the lever (G) and connecting rod (H) for elevating or depressing the mirror substantially as specified.

2. Combining with the revolving collar (B) the adjustable rail (I) and its traverser (*e*) substantially as and for the purposes set forth.

In testimony whereof I have hereunto subscribed my name before two subscribing witnesses this 22nd day of January 1861.

D. A. WOODWARD.

Witnesses:
WM. M. SMITH,
J. T. TAYLOR.